(12) United States Patent
Woo et al.

(10) Patent No.: US 12,381,205 B2
(45) Date of Patent: Aug. 5, 2025

(54) POSITIVE ELECTRODE ACTIVE MATERIAL FOR LITHIUM SECONDARY BATTERY

(71) Applicant: L&F CO., LTD., Daegu (KR)

(72) Inventors: Joo Hyeong Woo, Busan (KR); Sung Kyun Chang, Daegu (KR); Sang Hoon Jeon, Daegu (KR); Chang Min Choi, Daegu (KR); Sung Woo Cho, Daegu (KR); Ji Sun An, Daegu (KR)

(73) Assignee: L&F CO., LTD., Daegu (KR)

( * ) Notice: Subject to any disclaimer, the term of this patent is extended or adjusted under 35 U.S.C. 154(b) by 854 days.

(21) Appl. No.: 17/620,205

(22) PCT Filed: Jun. 15, 2020

(86) PCT No.: PCT/KR2020/007682
§ 371 (c)(1),
(2) Date: Apr. 29, 2022

(87) PCT Pub. No.: WO2020/256359
PCT Pub. Date: Dec. 24, 2020

(65) Prior Publication Data
US 2022/0263074 A1    Aug. 18, 2022

(30) Foreign Application Priority Data
Jun. 17, 2019 (KR) .................. 10-2019-0071246

(51) Int. Cl.
| | | |
|---|---|---|
| $H01M\ 4/36$ | (2006.01) | |
| $H01M\ 4/50$ | (2010.01) | |
| $H01M\ 4/505$ | (2010.01) | |
| $H01M\ 4/52$ | (2010.01) | |
| $H01M\ 4/525$ | (2010.01) | |
| $H01M\ 4/62$ | (2006.01) | |
| $H01M\ 10/05$ | (2010.01) | |
| $H01M\ 10/0525$ | (2010.01) | |
| $H01M\ 4/02$ | (2006.01) | |

(52) U.S. Cl.
CPC .......... $H01M\ 4/366$ (2013.01); $H01M\ 4/505$ (2013.01); $H01M\ 4/525$ (2013.01); $H01M\ 4/62$ (2013.01); $H01M\ 10/0525$ (2013.01); $H01M\ 2004/021$ (2013.01); $H01M\ 2004/027$ (2013.01)

(58) Field of Classification Search
None
See application file for complete search history.

(56) References Cited

U.S. PATENT DOCUMENTS

2019/0165362 A1*  5/2019  Baek .................... $H01M\ 4/625$

FOREIGN PATENT DOCUMENTS

| JP | 2010-40383 | | 2/2010 | |
|---|---|---|---|---|
| KR | 10-2014-0044594 | | 4/2014 | |
| KR | 10-2016-0026402 | | 3/2016 | |
| KR | 20160026402 | * | 3/2016 | ........ $H01M\ 10/0525$ |
| KR | 10-2018-0090211 | | 8/2018 | |
| KR | 20180090211 | * | 10/2018 | ............ $C01B\ 35/10$ |
| WO | 2016/017073 | | 2/2016 | |

* cited by examiner

Primary Examiner — Barbara L Gilliam
Assistant Examiner — Angela J Martin
(74) Attorney, Agent, or Firm — LEX IP MEISTER, PLLC

(57) ABSTRACT

Disclosed is a cathode active material for a lithium secondary battery including a core containing lithium composite metal oxide and a coating layer disposed on the core and having an amorphous phase, wherein the amorphous phase contains lithium oxide, tungsten oxide, and boron oxide in a form of mixture.

10 Claims, No Drawings

POSITIVE ELECTRODE ACTIVE MATERIAL FOR LITHIUM SECONDARY BATTERY

TECHNICAL FIELD

The present invention relates to a cathode active material for a lithium secondary battery including a core containing lithium composite metal oxide and a coating layer disposed on the core, wherein the coating layer includes an amorphous phase containing lithium oxide, tungsten oxide, and boron oxide in a form of mixture.

BACKGROUND ART

Lithium secondary batteries are used in various fields, such as those of mobile devices, energy storage systems and electric vehicles, due to their high energy density and voltage, long cycle life, and low self-discharge rate.

Furthermore, lithium secondary batteries are required to exhibit various characteristics depending on the usage environment of the devices or appliances to which they are applied, and in particular are required to exhibit sufficient output characteristics at low temperatures when mounted in devices or appliances used in environments subject to great temperature changes or in cold areas.

Accordingly, there are examples of coating materials of cathode active materials using tungsten, boron or the like in order to improve the low-temperature characteristics thereof. However, conventional coating layers containing tungsten, boron or the like, used for cathode active materials, take the form of $Li_pW_qB_rO_x$, which is a crystalline compound. For this reason, the cathode active materials are problematic because they are not coated on the core in a crystallized state, but are separately present on the outside of the core, or are not uniformly coated on the surface thereof.

Examples of the related art will be described in more detail. First, Japanese Patent Application Laid-Open Publication No. 2011-216214 discloses a method of preparing a cathode active material represented by $Li_{1+x}M_yMn_{2-x-y}O_4 \cdot aLi_2B_4O_7 \cdot bLi_2WO_4$ including weighing a lithium compound, a manganese compound, a tungsten compound, a boron compound, and, if necessary, a substituted metal element compound or the like, mixing the compounds so as to obtain a desired composition and then heat-treating the resulting mixture to a firing temperature of 650° C. or more. However, the method aims at coating the surface of the core with $aLi_2B_4O_7 \cdot bLi_2WO_4$ crystals (monoclinic, etc.) and thus it is difficult to secure desired characteristics of coating uniformity and coating scalability using the method.

In another example, Korean Patent Application Laid-Open Publication No. 10-2017-0063395 discloses that, in the step of preparing a precursor for a cathode active material, a tungsten-containing material is mixed with a lithium raw material, followed by firing to obtain a cathode active material core, after which a boron raw material is mixed with a tungsten raw material, followed by heat treatment, to treat the surface of the core with $LiBO_2$ and $Li_2WO_4$. However, this method also aims at coating the surface of the core with the crystallized compound of boron and tungsten, and thus it is difficult to secure desired coating uniformity and coating scalability characteristics using the method.

It is difficult for the lithium secondary batteries manufactured using the cathode active materials obtained in the prior art described above to exhibit low-temperature characteristics meeting a desired level due to the characteristics of the coating layer applied to the surface of the core. Thus, there is increasing need for the development of novel cathode active materials capable of solving these problems.

PRIOR ART

Patent Literature

Japanese Patent Application Laid-Open Publication No. 2011-216214
Korean Patent Application Laid-Open Publication No. 10-2017-0063395

DISCLOSURE

Technical Problem

Therefore, the present invention has been made to solve the above and other technical problems that have yet to be resolved.

Therefore, as a result of extensive research and various experimentation, the present inventors have developed a novel cathode active material including a coating layer having an amorphous phase, and found that, since the cathode active material includes an amorphous phase containing lithium oxide, tungsten oxide, and boron oxide in a form of mixture, a decrease in binding force to the core can be prevented, uniform coating can be realized, and the discharge capacity, output characteristics, and cycle characteristics of a lithium secondary battery, particularly the low-temperature characteristics thereof, can be remarkably improved. Based on this finding, the present invention has been completed.

Technical Solution

In accordance with one aspect of the present invention, provided is a cathode active material for a lithium secondary battery including a core containing lithium composite metal oxide and a coating layer disposed on the core and having an amorphous phase, wherein the amorphous phase contains lithium oxide, tungsten oxide, and boron oxide in a form of mixture.

The cathode active material for a lithium secondary battery according to the present invention has a structure in which an amorphous phase containing lithium oxide, tungsten oxide, and boron oxide in a form of mixture is present in the coating layer, thereby forming a uniform coating on the surface of the core and remarkably improving the discharge capacity, output characteristics and cycle characteristics of the lithium secondary battery, in particular, the output characteristics at low temperatures thereof.

In a specific embodiment, the lithium composite metal oxide may include one or more transition metals, and may have a layered crystal structure that can be used at high capacity and high voltage, and specifically may be a substance represented by the following Formula 1:

$$Li[Li_xM_{1-x-y}D_y]O_{2-a}Q_a \qquad (1)$$

wherein M includes at least one transition metal element that is stable in a 4- or 6-coordination structure;
D includes at least one element selected from an alkaline earth metal, a transition metal, and a non-metal as a dopant;
Q includes at least one anion; and
$0 \leq x \leq 0.1$, $0 \leq y \leq 0.1$, $0 \leq a \leq 0.2$.
For reference, when D is a transition metal, this transition metal is excluded from the transition metal defined for M.

In a preferred embodiment,

M includes at least two elements selected from the group consisting of Ni, Co, and Mn;

D includes at least one element selected from the group consisting of Al, W, Si, V, B, Ba, Ca, Zr, Ti, Mg, Ta, Nb and Mo; and Q includes at least one element selected from F, S and P.

In addition, the lithium composite metal oxide may have a crystal structure rather than a layered structure, and examples of such a crystal structure include, but are not limited to, a spinel structure and an olivine structure.

The core may have an average particle diameter (D50) of, for example, 1 to 50 μm, but is not limited thereto.

The lithium composite metal oxide forming the core having the composition described above may be prepared by a method known in the art, and thus a description thereof will be omitted herein.

One of the features of the present invention is that the amorphous phase containing lithium oxide, tungsten oxide and boron oxide in a form of mixture is present in the coating layer.

As will be described later, the lithium oxide, tungsten oxide and boron oxide present in the amorphous phase may be adhered to the surface of the core at a low firing temperature for surface treatment of the core, which contains a lithium composite metal oxide. In this process, lithium oxide and boron oxide may act as a coating agent to facilitate the process of adhering the tungsten oxide onto the core.

The coating layer may contain a substance having the composition of the following Formula 2:

$$\alpha W_x O_y \text{-} \beta B_m O_n \text{-} \gamma Li_2 O \qquad (2)$$

wherein the conditions $\alpha+\beta+\Gamma=1$, $0.25 \leq x/y \leq 0.5$, and $0.5 \leq m/n \leq 0.75$ are satisfied, wherein $\alpha$, $\beta$ and $\gamma$ are set on a weight basis.

In a non-limiting example, Formula 2 may be represented by $\alpha WO_3\text{-}\beta B_2O_3\text{-}\gamma Li_2O$, more specifically, $WO_3\text{—}B_2O_3\text{—}Li_2O$, $2WO_3\text{-}2B_2O_3\text{—}Li_2O$, $2WO_3\text{-}3B_2O_3\text{—}Li_2O$, $3WO_3\text{-}2B_2O_3\text{—}Li_2O$, $WO_3\text{—}B_2O_3\text{-}3Li_2O$, ½($2WO_3\text{—}B_2O_3\text{—}Li_2O$), ½($WO_3\text{-}2B_2O_3\text{—}Li_2O$), ½($3WO_3\text{-}2B_2O_3\text{—}Li_2O$), ½($2WO_3\text{-}3B_2O_3\text{—}Li_2O$), ½($4WO_3\text{-}3B_2O_3\text{-}3Li_2O$), ½($3WO_3\text{-}4B_2O_3\text{-}3Li_2O$) or the like.

$Li_2O$ can improve the meltability or formability of the coating layer by lowering the high-temperature viscosity of glassy oxide. In addition, $Li_2O$ has excellent lithium ion conductivity and does not react with an electrolyte or hydrogen fluoride derived from the electrolyte during charging and discharging. Such $Li_2O$ may be formed by oxidation upon firing of a lithium compound added before firing, may be added as $Li_2O$ itself, or may be derived from a lithium-containing component such as LiOH or $Li_2CO_3$ present on the surface of the core in the process of preparing lithium composite metal oxide as the core.

The lithium oxide may be present in the amorphous phase in the coating layer in an amount of 2 parts by weight or less, preferably 0.01 to 2 parts by weight, more preferably 0.1 to 1 part by weight, particularly preferably 0.1 to 0.5 parts by weight based on 100 parts by weight of the lithium composite metal oxide constituting the core. When the content of lithium oxide is excessively low, undesirably, there is a problem in that it is difficult to achieve uniform coating as described above, and when the content is excessively high, undesirably, the lithium oxide is additionally coated on tungsten oxide, which inhibits the coating effect that can be obtained by the tungsten oxide, or the coating is excessively thick, which acts as resistance in the battery.

In a specific embodiment, the tungsten oxide may be $WO_3$.

The tungsten oxide is present in the amorphous phase in the coating layer, thereby reducing the charge transfer resistance (RCT resistance) of the battery and suppressing agglomeration that occurs when separately present in a crystalline phase.

Meanwhile, lithium oxide such as $Li_2O$ in the form of a mixture with the tungsten oxide contained in the coating layer provides excellent coating formability and facilitates adhesion of tungsten oxide such as $WO_3$ to the surface of the core.

The tungsten oxide may be contained in the amorphous phase in the coating layer in an amount of 2 parts by weight or less, preferably 0.1 to 2 parts by weight, more preferably 0.1 to 1.1 parts by weight, and particularly preferably 0.1 to 0.5 parts by weight, based on 100 parts by weight of the lithium composite metal oxide constituting the core. When the content of tungsten oxide is excessively low, undesirably, it may be difficult to exhibit the effects described above, and when the content of tungsten oxide is excessively high, undesirably, it does not form a coating, but is separately present outside the core, impeding contact between the cathode active material and the conductive material and the binder when the electrode is formed, acting as a factor that hinders the movement of electrons in the electrode, and preventing desired output characteristics from being achieved.

In a specific embodiment, the boron oxide may be $B_2O_3$ and/or $B_2O_5$, preferably $B_2O_3$.

The boron oxide may be present as an ionic conductor, and may easily form an amorphous phase. In addition, the boron oxide can improve adhesion of the tungsten oxide to the core during heat treatment (firing) for coating by improving the coating formability along with lithium oxide.

The boron oxide may be present in the amorphous phase in an amount of 2 parts by weight or less, preferably 0.1 to 2 parts by weight, more preferably 0.1 to 1 parts by weight, and particularly preferably 0.1 to 0.5 parts by weight, based on 100 parts by weight of the lithium composite metal oxide as the core. When the content of boron oxide is excessively low, it may be difficult to achieve the effect described above, and on the other hand, when the content is excessively great, the boron oxide may act as a resistor on the surface and thus may cause a problem of reduced capacity, which is not preferable.

In a specific embodiment, the thickness of the coating layer may be 0.01 to 1 μm, preferably 0.02 to 0.5 μm. When the thickness of the coating layer is excessively small, undesirably, it may be difficult to expect a desired improvement in the low-temperature characteristics in the present invention, and when the thickness thereof is excessively great, undesirably, the coating layer may act as a factor that hinders the movement of lithium, which may increase the resistance of the battery.

Further, it is preferred that the coating layer be applied on at least 40% of the surface area of the core in order to remarkably improve the desired low-temperature characteristics according to the present invention.

The present invention also provides a method of preparing the cathode active material. Specifically, the preparation method according to the present invention includes mixing a tungsten-containing powder and a boron-containing powder, or a tungsten-containing powder, a boron-containing powder, and a lithium-containing powder, as coating raw materials with a lithium composite metal oxide powder for a core and firing the resulting mixture in an atmosphere containing oxygen in a temperature range within which an amorphous coating layer is formed.

That is, according to an embodiment of the preparation method of the present invention, core and coating materials for preparing a cathode active material are mixed in the form of powders, rather than a solvent-based mixture such as a slurry, suspension, or solution, followed by firing. As a result, it is possible to prevent a phenomenon in which a crystalline phase is formed by the reaction between the coating raw materials and to achieve effects of improving preparation workability and reducing preparation costs because solvents are not used.

The tungsten-containing powder may be the tungsten oxide (e.g., $WO_3$) that is itself to be contained in the coating layer, or may in some cases be other tungsten compounds capable of being converted to tungsten oxides through oxidation. Examples of such other tungsten compounds include, but are not limited to, $H_2WO_4$, $(NH_4)_{10}(H_2W_{12}O_{42}) \cdot XH_2O$, and $(NH_4)_6H_2W_{12}O_{40} \cdot XH_2O$ (wherein X is 1 to 5).

The boron-containing powder may be the boron oxide (e.g., $B_2O_3$) that is itself to be contained in the coating layer, or may in some cases be other boron compounds capable of being converted to boron oxides through oxidation. Examples of such other boron compounds include, but are not limited to, $H_3BO_3$ and $HBPO_4$.

The lithium-containing powder may be the lithium oxide that is itself to be contained in the coating layer, or may be other lithium compounds capable of being converted to lithium oxides through oxidation in some cases. Examples of such lithium compounds include, but are not limited to, $LiOH$, $Li_2CO_3$, $LiNO_3$, $Li_2SO_4$ and the like.

Here, the lithium oxide of the amorphous coating layer may be derived from a lithium-containing component present on the surface of the lithium composite metal oxide powder. In some cases, the method may include mixing only a tungsten-containing powder and a boron-containing powder with a lithium composite metal oxide powder, followed by firing. In this case, the reaction depicted by the following reaction scheme may occur.

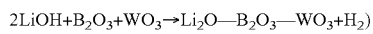
$2LiOH + B_2O_3 + WO_3 \rightarrow Li_2O\text{—}B_2O_3\text{—}WO_3 + H_2)$ The firing temperature range, within which the amorphous coating layer is formed, may vary slightly depending on the type and content requirements of the raw materials, and may be determined within a range within which the coating raw material does not form a crystal structure and does not diffuse into the core, for example, 150° C. or less, preferably from 150° C. to 500° C., and more preferably from 200° C. to 500° C. When the firing temperature is excessively low, adhesion of the oxides to the surface of the core may be deteriorated. Conversely, when the firing temperature is excessively high, undesirably, the coating layer is crystallized, and it may be difficult to form a uniform coating layer on the surface of the core.

The firing time may be within the range of about 2 to about 20 hours.

The coating raw material such as tungsten-containing powder or boron-containing powder preferably has an average particle diameter of about 0.01 to about 5 μm, so that the particles can be uniformly adsorbed on the surface of the core without causing agglomeration therebetween when mixing the core with the coating raw material for the preparation of the cathode active material. The particles are partially or completely melted during the firing process and are transformed into an amorphous phase to form a coating layer having the thickness defined above.

When firing is performed under the conditions described above, a coating layer having an amorphous phase containing lithium oxide, tungsten oxide, and boron oxide in a form of mixture is formed, so the coating area and uniformity can be increased and thus scalability can be increased when coating the surface of a core. Accordingly, as described above, the tungsten oxide contained in the amorphous phase can reduce RCT resistance and suppress a phenomenon in which the tungsten oxide is present separately from the core or agglomerates due to crystallization. In addition, the coating uniformity of lithium oxide (for example, $Li_2O$) and boron oxide (for example, $B_2O_3$), which are ion conductors, can also be increased, and tungsten oxide easily adheres to the surface due to the coating formability of the lithium oxide and boron oxide.

The present invention also provides a lithium secondary battery including the cathode active material. The configuration and production method of the lithium secondary battery are known in the art, and thus a detailed description thereof will be omitted herein.

Effects of the Invention

As described above, the cathode active material according to the present invention includes a specific coating layer having an amorphous phase on the surface of the core, and is thus capable of suppressing a phenomenon in which a coating material is crystallized and is present separately outside the core, rather than on the surface of the core, and of securing a uniform and large coating area, thereby exerting effects of greatly improving the discharge capacity, output characteristics, and cycle characteristics of the lithium secondary battery, particularly the output characteristics thereof at low temperatures.

BEST MODE

Now, the present invention will be described in more detail with reference to the following examples. These examples should not be construed as limiting the scope of the present invention.

Example 1

(Preparation of Cathode Active Material)

Boron oxide ($B_2O_3$) and tungsten oxide ($WO_3$) were mixed in the amounts shown in Table 1 below with 100 parts by weight of lithium composite metal oxide (Li($Ni_{0.60}Co_{0.20}Mn_{0.20}$)$_{0.994}Ti_{0.004}Zr_{0.002}O_2$) using a dry mixer, followed by heat treatment in an air atmosphere at 500° C. for 7 hours, to prepare a cathode active material having a coating layer (about 0.01 to about 0.1 μm) having an amorphous phase containing the mixture of lithium oxide, tungsten oxide and boron oxide.

It was ascertained that lithium oxide was produced by oxidation of the byproduct remaining on the surface of the lithium composite metal oxide, and about 0.20 to 0.25 parts by weight of lithium oxide ($Li_2O$) was formed by oxidation during heat treatment.

(Production of Cathode)

The cathode active material prepared above, Super-P as a conductive material, and PVdF as a binder were mixed at a weight ratio of 95:2:3 in the presence of N-methylpyrrolidone as a solvent to prepare a cathode active material paste. The cathode active material paste was applied onto an aluminum current collector, dried at 130° C., and then rolled to produce a cathode.

(Production of Lithium Secondary Battery)

A porous polyethylene film as a separator was interposed between the cathode produced above and an anode as a Li metal to produce an electrode assembly, the electrode assembly was placed in a battery case, and an electrolyte was injected into the battery case to produce a lithium secondary battery. The electrolyte used herein was prepared by dissolving 1.0M lithium hexafluorophosphate (LiPF$_6$) in an organic solvent consisting of ethylene carbonate/dimethyl carbonate (mixed at a volume ratio of EC/DMC=1/1).

Example 2

A cathode active material, a cathode, and a lithium secondary battery were produced under the same conditions as in Example 1, except that the heat treatment temperature was 200° C.

Example 3

A cathode active material, a cathode, and a lithium secondary battery were produced under the same conditions as in Example 1, except that the heat treatment temperature was 400° C.

Comparative Example 1

A cathode active material, a cathode, and a lithium secondary battery were produced under the same conditions as in Example 1, except that mixing with B$_2$O$_3$ and WO$_3$ was omitted.

Comparative Example 2

A cathode active material, a cathode, and a lithium secondary battery were produced under the same conditions as in Example 1, except that the heat treatment temperature was 700° C.

Comparative Example 3

A cathode active material, a cathode, and a lithium secondary battery were produced under the same conditions as in Example 1, except that the heat treatment temperature was 600° C.

Example 4

A cathode active material, a cathode, and a lithium secondary battery were produced under the same conditions as in Example 1, except that Li(Ni$_{0.38}$Co$_{0.31}$Mn$_{0.31}$)$_{0.994}$Ti$_{0.004}$Zr$_{0.002}$O$_2$ was prepared as lithium composite metal oxide instead of Li(Ni$_{0.60}$Co$_{0.20}$Mn$_{0.20}$)$_{0.994}$Ti$_{0.004}$Zr$_{0.002}$O$_2$, and the heat treatment temperature was 400° C.

Comparative Example 4

A cathode active material, a cathode, and a lithium secondary battery were produced under the same conditions as in Example 4, except that mixing with B$_2$O$_3$ and WO$_3$ was omitted.

Example 5

A cathode active material, a cathode, and a lithium secondary battery were produced under the same conditions as in Example 1, except that Li(Ni$_{0.50}$Co$_{0.20}$Mn$_{0.30}$)$_{0.994}$Ti$_{0.004}$Zr$_{0.002}$O$_2$ was prepared as lithium composite metal oxide instead of Li(Ni$_{0.60}$Co$_{0.20}$Mn$_{0.20}$)$_{0.994}$Ti$_{0.004}$Zr$_{0.002}$O$_2$ and the heat treatment temperature was 400° C.

Comparative Example 5

A cathode active material, a cathode, and a lithium secondary battery were produced under the same conditions as in Example 5, except that mixing with B$_2$O$_3$ and WO$_3$ was omitted.

Example 6

A cathode active material, a cathode, and a lithium secondary battery were produced under the same conditions as in Example 1, except that Li(Ni$_{0.70}$Co$_{0.15}$Mn$_{0.15}$)$_{0.994}$Ti$_{0.004}$Zr$_{0.002}$O$_2$ was prepared as lithium composite metal oxide instead of Li(Ni$_{0.60}$Co$_{0.20}$Mn$_{0.20}$)$_{0.994}$Ti$_{0.004}$Zr$_{0.002}$O$_2$, and the heat treatment temperature was 400° C.

Comparative Example 6

A cathode active material, a cathode, and a lithium secondary battery were produced under the same conditions as in Example 6, except that mixing with B$_2$O$_3$ and WO$_3$ was omitted.

Example 7

A cathode active material, a cathode, and a lithium secondary battery were produced under the same conditions as in Example 1, except that Li(Ni$_{0.80}$Co$_{0.10}$Mn$_{0.10}$)$_{0.994}$Ti$_{0.004}$Zr$_{0.002}$O$_2$ was prepared as lithium composite metal oxide instead of Li(Ni$_{0.60}$Co$_{0.20}$Mn$_{0.20}$)$_{0.994}$Ti$_{0.004}$Zr$_{0.002}$O$_2$ and the heat treatment temperature was 400° C.

Comparative Example 7

A cathode active material, a cathode, and a lithium secondary battery were produced under the same conditions as in Example 7, except that mixing with B$_2$O$_3$ and WO$_3$ was omitted.

TABLE 1

| Item | Core Ni:Co:Mn | Coating layer B$_2$O$_3$ (parts by weight) | Coating layer WO$_3$ (parts by weight) | Heat treatment temperature (° C.) |
|---|---|---|---|---|
| Example 1 | 60:20:20 | 0.15 | 0.375 | 500 |
| Example 2 | 60:20:20 | 0.15 | 0.375 | 200 |
| Example 3 | 60:20:20 | 0.15 | 0.375 | 400 |
| Comparative Example 1 | 60:20:20 | — | — | — |
| Comparative Example 2 | 60:20:20 | 0.15 | 0.375 | 700 |
| Comparative Example 3 | 60:20:20 | 0.15 | 0.375 | 600 |
| Example 4 | 38:31:31 | 0.15 | 0.375 | 400 |
| Comparative Example 4 | 38:31:31 | — | — | 400 |
| Example 5 | 50:20:30 | 0.15 | 0.375 | 400 |
| Comparative Example 5 | 50:20:30 | — | — | 400 |
| Example 6 | 70:15:15 | 0.15 | 0.375 | 400 |

TABLE 1-continued

| Item | Core Ni:Co:Mn | Coating layer B₂O₃ (parts by weight) | Coating layer WO₃ (parts by weight) | Heat treatment temperature (° C.) |
|---|---|---|---|---|
| Comparative Example 6 | 70:15:15 | — | — | 400 |
| Example 7 | 80:10:10 | 0.15 | 0.375 | 400 |
| Comparative Example 7 | 80:10:10 | — | — | 400 |

Experimental Example

Each of the lithium secondary batteries produced in Examples 1 to 7 and Comparative Examples 1 to 7 was subjected to 0.1 C charge and 0.1 C discharge twice at room temperature for electrode stabilization wherein the charge was performed at 4.3V and the discharge cutoff voltage was 3.0V, followed by 0.2 C charge and 0.2 C discharge twice and then 0.2 C charge and 2.0 C discharge at −25° C. for evaluation of low-temperature output characteristics. The ratio (rate retention: %) of the output measured at 2.0 C based on the output measured at 0.2 C was calculated at −25° C. and shown in Table 2 below.

In addition, each of the lithium secondary batteries was repeatedly charged and discharged at 25° C., and the discharge capacities at the $30^{th}$, $40^{th}$ and $50^{th}$ cycles compared to the discharge capacity at the $1^{st}$ cycle are shown in Table 3 below.

TABLE 2

| Item | 0.2/0.2 C($2^{nd}$) CC mAh/g | 0.2/0.2 C($2^{nd}$) DC mAh/g | 0.2/0.2 C($2^{nd}$) Eff. % | 0.2/2.0 C CC mAh/g | 0.2/2.0 C DC mAh/g | 0.2/2.0 C Eff. % | Rate retention 2.0 C % |
|---|---|---|---|---|---|---|---|
| Example 1 | 152.4 | 151.7 | 99.5 | 122.4 | 114.8 | 93.8 | 75.7 |
| Example 2 | 152.6 | 152.2 | 99.7 | 122.9 | 115.4 | 93.9 | 75.8 |
| Example 3 | 153.2 | 153.0 | 99.9 | 123.8 | 117.5 | 94.9 | 76.8 |
| Comparative Example 1 | 153.2 | 151.8 | 99.1 | 117.9 | 98.9 | 83.9 | 65.2 |
| Comparative Example 2 | 152.0 | 150.6 | 99.1 | 121.1 | 105.6 | 90.8 | 70.1 |
| Comparative Example 3 | 151.3 | 149.7 | 98.9 | 120.4 | 107.6 | 90.2 | 71.9 |
| Example 4 | 132.9 | 132.8 | 99.9 | 107.4 | 102.1 | 95.1 | 76.9 |
| Comparative Example 4 | 131.4 | 129.7 | 98.7 | 95.9 | 83.0 | 86.5 | 64.0 |
| Example 5 | 143.7 | 143.4 | 99.8 | 115.8 | 109.7 | 94.7 | 76.5 |
| Comparative Example 5 | 141.9 | 139.6 | 98.4 | 105.9 | 89.2 | 84.2 | 63.9 |
| Example 6 | 166.0 | 165.7 | 99.8 | 133.7 | 126.2 | 94.4 | 76.2 |
| Comparative Example 6 | 162.8 | 159.5 | 98.0 | 122.9 | 103.1 | 83.9 | 64.6 |
| Example 7 | 182.9 | 182.2 | 99.6 | 147.0 | 138.0 | 93.9 | 75.7 |
| Comparative Example 7 | 179.3 | 176.6 | 98.5 | 134.0 | 113.4 | 84.6 | 64.2 |

TABLE 3

| Item | 1CY mAh/g | 30CY mAh/g | 40CY mAh/g | 50CY mAh/g | 30CY/1CY % | 40CY/1CY % | 50CY/1CY % |
|---|---|---|---|---|---|---|---|
| Example 1 | 171.6 | 166.7 | 165.3 | 163.2 | 97.1 | 96.3 | 95.1 |
| Example 2 | 171.8 | 167.8 | 165.2 | 162.9 | 97.7 | 96.2 | 94.8 |
| Example 3 | 170.9 | 165.2 | 162.8 | 160.2 | 96.7 | 95.3 | 93.7 |
| Comparative Example 1 | 168.7 | 161.4 | 158.3 | 150.4 | 95.7 | 93.8 | 89.2 |
| Comparative Example 2 | 170.6 | 160.4 | 154.1 | 151.7 | 94.0 | 90.3 | 88.9 |
| Comparative Example 3 | 171.5 | 165.9 | 160.7 | 156.8 | 96.7 | 93.7 | 91.4 |
| Example 4 | 149.5 | 147.5 | 145.3 | 143.8 | 98.7 | 97.2 | 96.2 |
| Comparative Example 4 | 147.7 | 144.5 | 140 | 134 | 97.8 | 94.8 | 90.7 |
| Example 5 | 156.2 | 153.7 | 151.1 | 148.6 | 98.4 | 96.7 | 95.1 |
| Comparative Example 5 | 153.5 | 147.9 | 144.7 | 138 | 96.4 | 94.3 | 89.9 |
| Example 6 | 179.5 | 174.49 | 170.9 | 168.2 | 97.2 | 95.2 | 93.7 |
| Comparative Example 6 | 175.8 | 167.5 | 162 | 154.5 | 95.3 | 92.2 | 87.9 |
| Example 7 | 198.6 | 191.9 | 187.8 | 184.9 | 96.6 | 94.6 | 93.1 |
| Comparative Example 7 | 194.4 | 183 | 177.8 | 168 | 94.1 | 91.5 | 86.4 |

As can be seen from Tables 2 and 3, the lithium secondary batteries of Examples 1 to 7 according to the present invention have high discharge capacity and high discharge efficiency and exhibit remarkably excellent output characteristics at low temperatures, in particular, excellent output characteristics under high-rate discharge conditions (2.0 C discharge) and excellent cycle characteristics, compared to the lithium secondary batteries of Comparative Examples 1 to 7.

The reason for this is that, in Examples 1 to 7 according to the present invention, because the cathode active material is fired at a relatively low temperature, a coating layer having an amorphous phase is uniformly formed on the surface of the core, the movement of lithium ions is facilitated, and electrical conductivity (lithium ion conductor) is improved, whereas in Comparative Examples 1 to 7, a crystalline coating layer is formed on the surface of the core because firing is performed at a higher temperature than in Examples of the present invention.

Although preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cathode active material for a lithium secondary battery comprising:
   a core containing lithium composite metal oxide; and
   a coating layer disposed on the core and having an amorphous phase,
   wherein the amorphous phase comprises lithium oxide, tungsten oxide, and boron oxide in a form of mixture, and
   wherein the coating layer comprises a substance having the composition represented by the following Formula 2:

$$\alpha W_x O_y \text{-} \beta B_m O_n \text{-} \gamma Li_2 O \tag{2}$$

wherein the conditions $\alpha+\beta+\gamma=1$, $0.25 \leq x/y \leq 0.5$, and $0.5 \leq m/n \leq 0.75$ are satisfied.

2. The cathode active material according to claim 1, wherein the coating layer comprises a substance having a composition represented by the following Formula 3:

$$\alpha WO_3 \text{-} \beta B_2 O_3 \text{-} \gamma Li_2 O \tag{3}$$

wherein $\alpha+\beta+\gamma=1$ is satisfied.

3. The cathode active material according to claim 1, wherein the core has an average particle diameter of 1 to 50 µm.

4. The cathode active material according to claim 1, wherein the lithium oxide, the tungsten oxide and the boron oxide in the amorphous phase are present in amounts of 0.01 to 2 parts by weight, 0.1 to 2 parts by weight, and 0.1 to 2 parts by weight, respectively, based on 100 parts by weight of the core.

5. The cathode active material according to claim 1, wherein the coating layer has a thickness of 0.01 to 1 µm.

6. The cathode active material according to claim 1, wherein the coating layer is coated on 40 to 100% of a surface area of the core.

7. A method of preparing the cathode active material according to claim 1, the method comprising:
mixing (i) a tungsten-containing powder and a boron-containing powder, or (ii) or a tungsten-containing powder, a boron-containing powder, and a lithium-containing powder, with a lithium composite metal oxide powder for a core, followed by firing in an atmosphere containing oxygen in a temperature range within which an amorphous coating layer is formed.

8. The method according to claim 7, wherein the method comprises mixing the tungsten-containing powder and the boron-containing powder with the lithium composite metal oxide powder, followed by firing, and the lithium oxide of the amorphous coating layer is derived from a lithium-containing component present on the surface of the lithium composite metal oxide powder.

9. The method according to claim 7, wherein the temperature range is 150 to 500° C.

10. A lithium secondary battery comprising the cathode active material according to claim 1.

* * * * *